Figure 1:
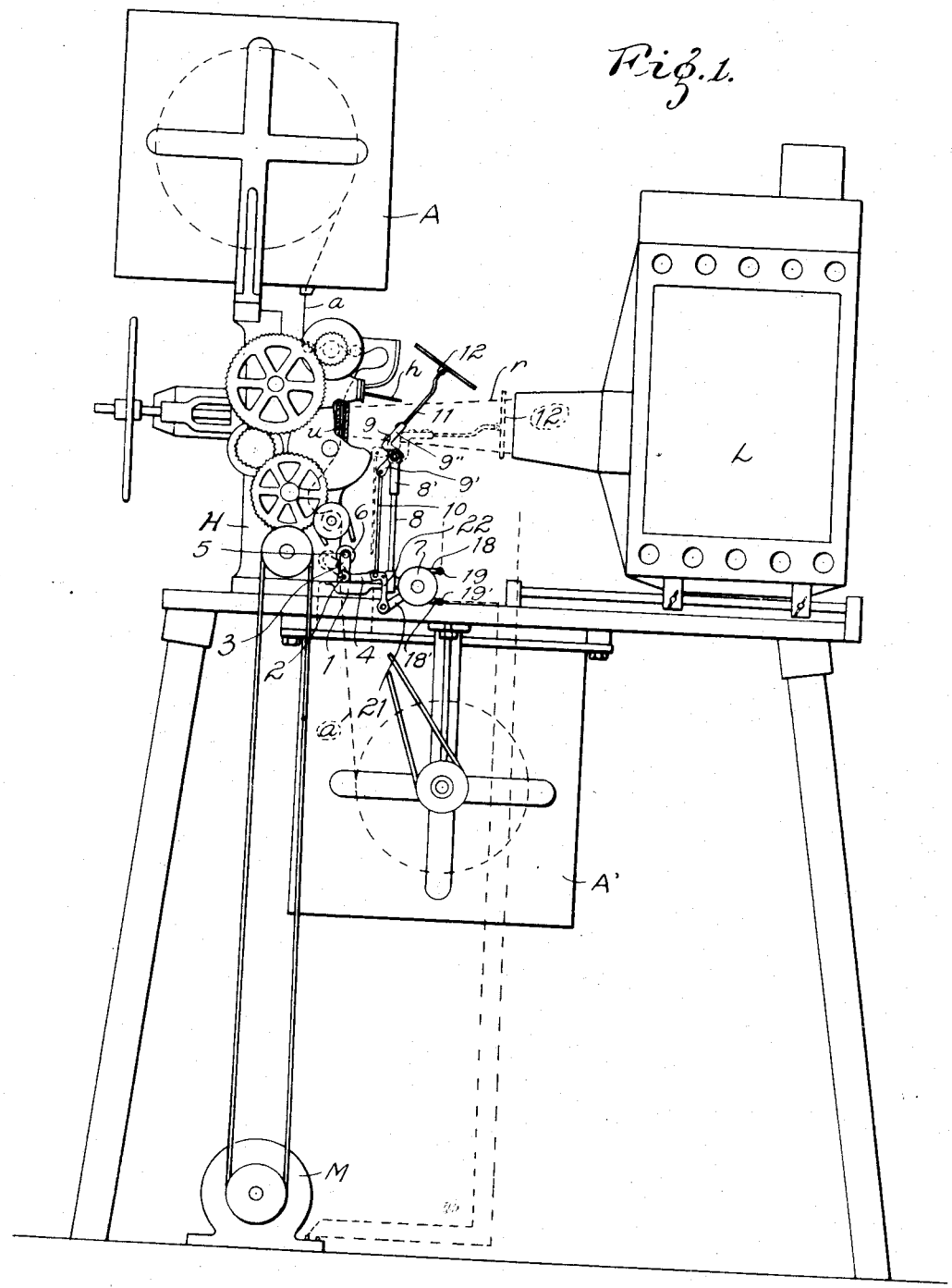

Mar. 13, 1923.

J. C. CHAMBERS.
MOTION PICTURE PROJECTING MACHINE.
FILED DEC. 12, 1921.

1,448,357.

2 SHEETS—SHEET 1.

Inventor:
James C. Chambers
By Harry A. Beimer
Attorney.

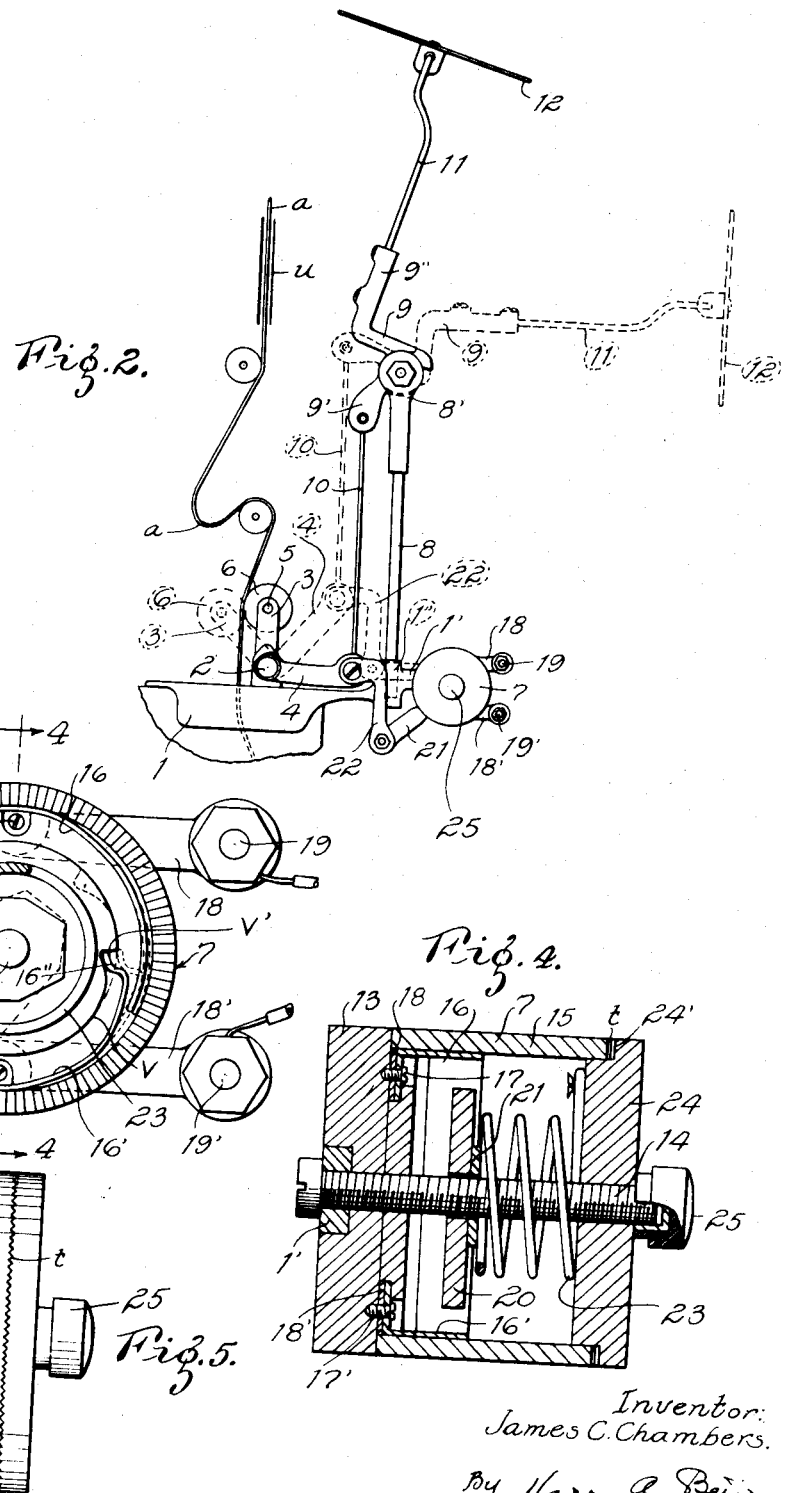

Patented Mar. 13, 1923.

1,448,357

UNITED STATES PATENT OFFICE.

JAMES C. CHAMBERS, OF ST. LOUIS, MISSOURI.

MOTION-PICTURE-PROJECTING MACHINE.

Application filed December 12, 1921. Serial No. 521,719.

*To all whom it may concern:*

Be it known that I, JAMES C. CHAMBERS, a citizen of the United States, residing at St. Louis, State of Missouri, have invented certain new and useful Improvements in Motion - Picture - Projecting Machines, of which the following is a specification.

The present invention is directed to motion picture projecting machines, these pictures as well understood in the art, being carried on films composed of highly inflammable material. To secure the necessary projection a powerful light must be employed, the heat generated by such light being sufficient to ignite the film should the movement of the latter be arrested for any appreciable length of time during the normal operation of the machine. Under the present state of the art suitable provision is made to automatically interpose a shutter or shield in the path of the light rays the moment the feed of the film is stopped as a result of the stopping of the machine or motion head by which the film is advanced.
So far as I am aware, however, no provision exists for cutting off the light rays in the event that the film breaks or becomes in any way disarranged or tangled while the motion head is in operation as frequently is the case in practice; and unless the operator is alert and is constantly watching the machine, the film, unless the light rays are at once cut off or intercepted under the conditions specified, takes fire and is thereby ruined or damaged. It is therefore the object of my invention to bring automatically into action a light shield or cut-off which shall instantly drop or move into a position in the path of the light rays and thus cut off the light and heat from the film until the latter may be readjusted by the operator. As well understood in the art, the film winds on one reel and unwinds from another and is under tension while in service or in motion;
and in the present embodiment of my invention I utilize this tension for controlling not only the action of the shield or cut-off aforesaid, but also the action of the contacts or wipers which close the circuit that conducts the current operating the motor by which the film is propelled. When anything therefore happens to the film which tends to remove the tension under which the same operates under normal service conditions, the shield or cut-off instantly asserts itself and the light rays are intercepted so that the film can not take fire. A further object of my invention is to provide a switch operable in connection with the shutter to open the motor circuit, said switch being entirely closed in and insulated from the machine. I also employ means within the switch housing for insuring prompt action of switch and shutter when, from any cause, the film tension is decreased. The advantages of the invention will be fully apparent from the following detailed description in connection with the accompanying drawings, in which—

Figure 1 represents a side elevation of a conventional motion picture projecting machine showing my invention applied thereto; Fig. 2 is a detached elevational view of the shutter and switch housing together with their connections; Fig. 3 is an enlarged face view of the switch housing with the cover removed showing the switch mounted therein; Fig. 4 is a cross-section of the switch housing taken on the line 4—4 of Fig. 3; and Fig. 5 is a side elevation of said housing with the lever arm that operates the switch cam in section.

Referring to the drawings, L represents a projecting lantern, H, the motion-head of film-advancing mechanism operated by the electric motor M, the film $a$ unwinding from a reel or spindle in the magazine A, and winding on a reel or spindle in the magazine A', motion being imparted to the film and to the reels by mechanism well known in the art and shown more or less conventionally in the drawings. The film in its passage from the unwinding to the winding reel is maintained taut, sufficient tension being imposed thereon to preserve uniformity of speed and positiveness of travel and prevent clogging or congestion. The tension or tautness of the film is a condition availed of under my invention to bring about the proper control of the mechanism by which the light shield or cut-off is actuated with any change or relaxation of said tension. As well understood in the art the film passes in front of a window $u$ through which the light rays $r$ are transmitted in their passage through the film, said rays being automatically cut off or intercepted by a hinge plate $h$ when the mechanism of the motion head comes to a stop. My invention has for its object to cut off the light (and heat) rays while the motion head is in operation and under circumstances where the film may accidentally tear or its travel becomes arrested or is continued from the unwinding reel without wrapping on the winding reel, and in general in cases where the tension or tautness of the film is for any reason relaxed.

In the present embodiment of my invention, I provide a bracket 1, which is fixed in any desirable manner to the motion head H of the machine, said bracket having a rockshaft 2 mounted on it, one end of the rockshaft carrying an arm 3 and the other end an arm 4. The arms 3 and 4 are locked to the shaft in any well known manner, and the arm 3 has a spindle 5 projecting from it, said spindle having a spool 6 freely rotatable on it as a journal.

The bracket 1 has a laterally projecting arm 1' which carries a switch housing 7 at its outer free end, the inner end of said arm terminating in a hollow enlargement 1'' for receiving and supporting a post 8. The upper end of the post 8 has secured to it a bifurcated terminal 8' to which is pivoted a bell-crank lever 9 comprising a short arm 9' and an L-shaped long arm 9'', the short arm 9' being connected by a rod 10 to the arm 4, and the long arm carrying an extension 11, on the end of which is fixed a shield 12 which operates as a shutter for the light rays from the lamp L, as will be hereinafter described.

The switch housing 7 is in the shape of a hollow cylinder composed of insulating material, and is closed at one end by a base 13 which is secured to the arm 1' by a stud 14, said stud being screwed through the arm 1' and base 13, and projecting beyond the cylindrical wall 15 of the housing. Arcuate contacts 16, 16' are fixed to the base 13 of the housing 7 at diametrically opposite points by screws 17, 17' respectively, said contacts 16, 16' being bound respectively to the inner ends of conductors 18, 18' by the screws 17, 17', said conductors being passed through slots in the wall 15, and the outer ends thereof carrying binding posts 19, 19'. A cam 20 is freely rotatable on the stud 14 in the same vertical plane with the contacts 16, 16', said cam having a lever 21 projecting from it and through a slot m in the wall 15, said lever being connected by a link 22 to the outer end of the arm 4 opposite to the rod 10. A spring 23 is coiled about the stud 14, one end of said spring being fixed to the lever 21 and the other end being fixed to a disk 24 which is passed over the stud 14 and serves as a cover for the housing 7. The edge of the wall 15 is provided with teeth t adapted to cooperate with an annular toothed shoulder 24' on the disk and the tension on the spring 23 may be regulated by rotating the disk 24 after which the disk is clamped to the housing by tightening a hand nut 25 screwed over the end of the stud 14.

The operation of the invention is as follows: While the projection machine is being operated, if, from any cause, the film a becomes slack and will no longer resist the pressure of spool 6 against it caused by the tension of the spring 23 exerted on the arm 4 through lever 21 and link 22, the result is that the cam 20 will be rotated to the position shown in Fig. 3, permitting the contacts 16, 16' to spring apart and break the electric circuit to the motor M. At the same time the arm 4 will be rocked to the dotted position shown in Fig. 2, and the shutter thrown down in front of the lamp L. Now, the motor is not only stopped, but the light rays are cut off from the film a. After the trouble has been remedied the shutter 12 is again raised, the switch being closed at the same time, since contact 16' will be forced into contact with contact 16 by the edge v of the cam 20, which engages the inwardly bent end 16'' of contact 16', and tension imposed on the spring 23. It will be observed that the edge v of the cam is notched at v', which is to permit the end 16'' of contact 16' to spring back into said notch and release said contact from contact 16 when the arm 21 is raised.

Having described my invention, I claim:

1. In combination with a motion picture projecting machine adapted to receive a traveling film maintained under tension, a light source adapted to project rays against the film, a fixed support, a shutter pivotally mounted on said support and operable to shut off said light rays on diminishing the normal tension on the film, a switch housing mounted on said support, an electric switch within said housing, said switch being controlled by connection with the shutter, and means within the switch housing for imparting movement to the shutter when the aforesaid film tension is decreased or removed.

2. In combination with a motion picture projecting machine adapted to receive a traveling film maintained under tension, a light source adapted to project rays against the film, a fixed support, a shutter pivotally mounted on said support and operable to shut off said light rays on diminishing the normal tension on the film, a switch housing mounted on said support, an electric switch within said housing, said switch being controlled by connection with the shutter, and means within the housing for maintaining the switch and shutter under tension counter to the tension imposed by the film so as to impart quick action to said switch and shutter when the tension on the film is reduced below normal.

3. In combination with a motion picture projecting machine adapted to receive a traveling film maintained under tension, a light source adapted to project rays against the film, a fixed support, a shutter pivotally mounted on said support and operable to shut off said light rays on diminishing the normal tension on the film, a switch housing mounted on said support, an electric switch within said housing, said switch being controlled by connection with the shutter, and comprising a spindle, a cam rotatable thereon, an operating lever passing through a slot in the housing and fixed to said cam, a pair of contacts mounted in the housing and adapted to be brought in contacting relation by rotation of the cam in a given direction, a binding post connected to each contact, a coiled spring fixed at one end to said cam and at the other end to the housing for imposing tension on the cam when the latter has been rotated to close the switch, and means for regulating said tension.

In testimony whereof I hereunto affix my signature.

JAMES C. CHAMBERS.